United States Patent [19]

Grossmann

[11] Patent Number: 4,506,743
[45] Date of Patent: Mar. 26, 1985

[54] LATCHING ARRANGEMENT FOR POWER TOOLS

[75] Inventor: Horst Grossmann, Huenfelden-Kirberg, Fed. Rep. of Germany

[73] Assignee: Black & Decker Inc., Newark, Del.

[21] Appl. No.: 441,415

[22] Filed: Nov. 12, 1982

[30] Foreign Application Priority Data

Nov. 13, 1981 [GB] United Kingdom ............... 8134220

[51] Int. Cl.³ .......................................... B25D 11/00
[52] U.S. Cl. ..................................... 173/48; 74/531; 173/109; 173/117; 173/123
[58] Field of Search ................... 173/48, 116, 47, 104, 173/118, 109, 123, 117; 70/312; 74/566, 531, 10.41; 408/126, 133

[56] References Cited

U.S. PATENT DOCUMENTS

| 3,123,156 | 3/1964 | Gapstur | 173/48 |
| 3,707,861 | 1/1973 | Lindner | 70/312 X |
| 3,774,699 | 11/1973 | Schmuck | 173/48 |
| 3,777,825 | 12/1973 | Gullich | 173/48 X |
| 3,834,468 | 9/1974 | Hettich et al. | 173/48 |
| 3,931,744 | 1/1976 | Wunsch | 173/48 |
| 4,038,508 | 7/1977 | Mapelsden | 74/531 |
| 4,236,588 | 12/1980 | Möldan et al. | 173/48 |
| 4,259,856 | 4/1981 | Wingert | 70/312 X |

Primary Examiner—Frank T. Yost
Assistant Examiner—Hien H. Phan
Attorney, Agent, or Firm—Ronald B. Sherer; Edward D. Murphy; Harold Weinstein

[57] ABSTRACT

A power tool has a changeover mechanism for varying at least one operational mode of the power tool. A rotatable control member having a lateral periphery is connected to the changeover mechanism. A detachable cover plate, forming part of the housing of the power tool, has an aperture therein through which the control member protrudes, and the lateral periphery of the control member is covered by the cover plate. A latching arrangement comprises a first latch component formed in said lateral periphery, and a second latch component located on the underside of the cover plate, the first and second latch components cooperating to retain the control member in a selected position, and one of these latch components is resilient. Preferably the second latch component is resilient and may be formed integrally with the cover plate. The cover plate may have two apertures for two control members with a common resilient latch member on the cover plate for both control members. The cover plate, which retains the or each control member in the power tool, facilitates assembly of and access to the latching arrangement.

7 Claims, 7 Drawing Figures

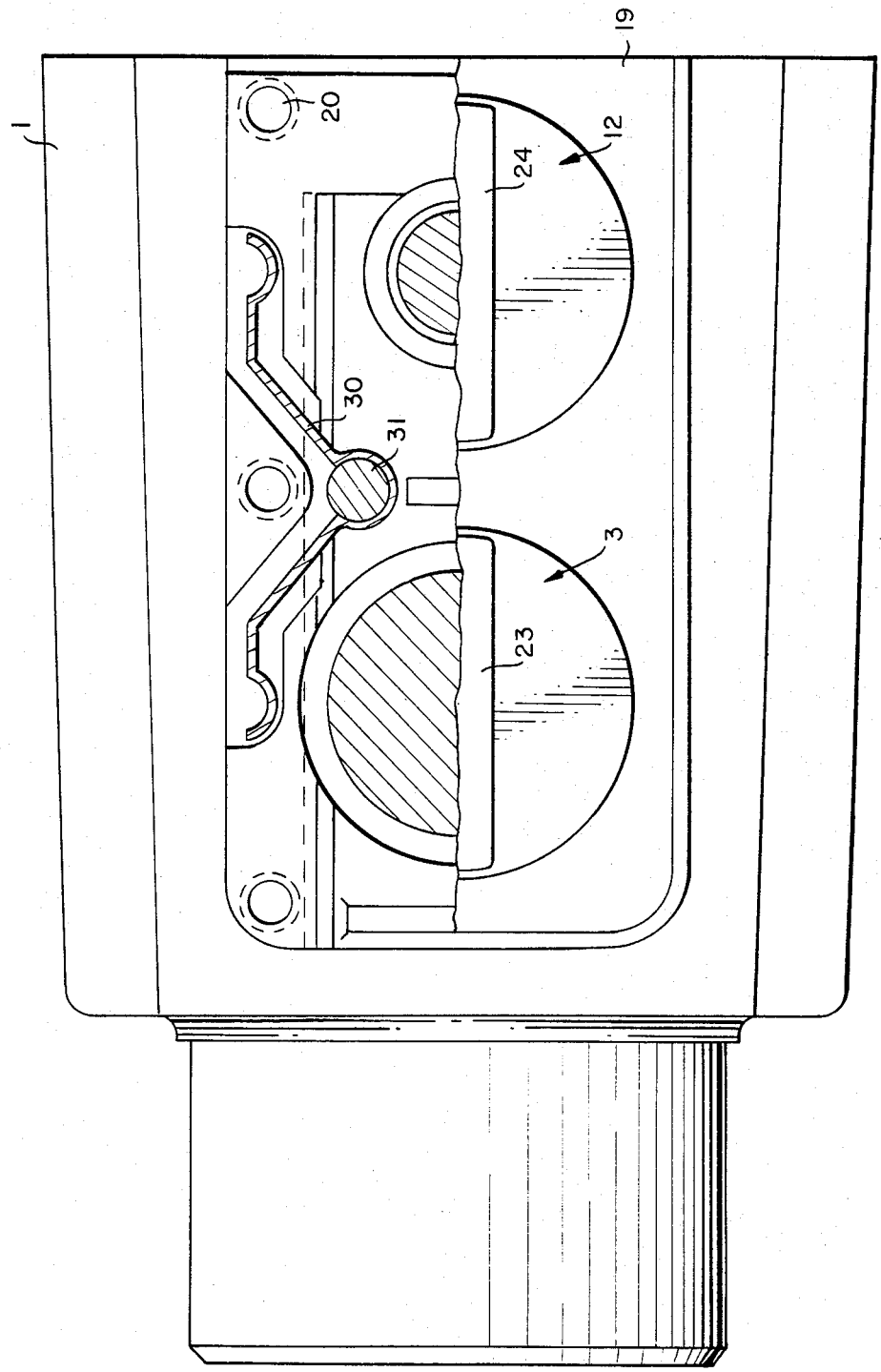

LATCHING ARRANGEMENT FOR POWER TOOLS

FIELD OF THE INVENTION

This invention relates to power tools incorporating a latching mechanism in conjunction with a selector switch for releasably retaining the selector switch in a selected position.

BACKGROUND OF THE INVENTION

Power tools, such as hand-held electric drills, are well known. Many modern electric drills now have a drill speed control mechanism whereby the drill can be rotated at two different speeds. Obviously, the lower speed is generally used for drilling larger holes whereas the higher speed is used for drilling holes of smaller diameter.

Further, many such drills are provided with a hammer mode so that they can be used either in a drill mode or in a hammer drill mode. In such drills the main shaft of the drill is displaceable in a longitudinal direction, usually against the force of a spring. Such displacement is often effected by rotating a control member which cooperates with a pin member, the pin member carrying a longitudinally extending, eccentric projection portion at its end remote from the control member. At the front end of the main shaft, two sets of ratchet teeth are provided. When the drill is in its "drill-only" mode, these sets of ratchet teeth are spaced apart and do not cooperate with one another. When, however, the drill is in its "hammer-mode" the ratchet teeth can engage with one another such that one of the sets of ratchet teeth associated with the chuck of the drill so as to rotate therewith rides over the crests and troughs of the other set of ratchet teeth which is usually formed on a fixed collar member surrounding the shaft. It will therefore be apparent that, although the drill still continues to rotate, the chuck, and therefore the drill bit, will also be moved in a reciprocating manner to provide a hammering effect.

The selection of the speed of rotation and/or the mode of operation is, as far as the user is concerned a matter of the utmost simplicity. Almost invariably, the or each selector is in the form of a control member, such as a button, located on the exterior of the housing of the drill. The user merely rotates the control member into an identifiable position.

It will, of course, be appreciated that it is of importance that once the drill speed and/or mode of operation has been selected, these parameters should not be variable other than at the will of the user. It is, therefore, necessary to provide a latch arrangement for preventing inadvertent change-over being effected or taking place without the knowledge of the user.

Latch mechanisms for achieving this are already known. In, for example, an electric drill having both a drill mode and a hammer drill mode, a control member is mounted on the exterior of the drill housing and communicates and cooperates with a pin member. This pin member has a main body portion which is generally cylindrical and, as mentioned hereinbefore, a longitudinally extending, eccentric projection portion. The pin member is located in a suitably dimensioned recess formed in the housing. In the external surface of the main body of the pin member, two diametrically opposed recesses are provided. In the wall of the recess in the housing two blind bores are formed, in each of which a spring-loaded ballbearing is fitted, the spring tending to urge its associated ballbearing into the appropriate recess in the pin member. Whilst the control member is being rotated the ballbearing is forced, by the cylindrical wall of the pin member, into the blind bore. However, when the control member is located in either of its two operative positions, the recess in the main body of the pin member is aligned with the blind bore. The ballbearing, under the action of the spring, is thus urged into the recess in the pin body. The ballbearing can, of course, be removed from the recess by further rotation of the control member.

A somewhat similar arrangement is present in the drill speed changeover mechanism. In this case, the control member includes a pin member which is eccentrically mounted with regard to the control member. The end of the pin remote from the control member is located between two gear wheels mounted on the main shaft of the drill. These two gear wheels are keyed onto the main shaft. Rotation of the control member through a desired angle causes movement of the gear wheels along the keyway so as to bring one or other of the gear wheels into engagement with a corresponding gear wheel mounted on a lay shaft.

The major disadvantage of known latching arrangements is that they tend to be situated in awkward locations. This is disadvantageous when machining the appropriate parts during manufacture of the drill. It also gives rise to the problem that, should a malfunction of the selector arrangement occur, the drill requires major dismantling before the fault can be rectified.

SUMMARY OF THE INVENTION

The present invention seeks to provide a latching arrangement which overcomes the disadvantages of known latching systems for power tools while still ensuring that the selector arrangement is maintained in a desired mode of operation when the tool is in use.

A feature of the present invention by which this is accomplished is the provision of one latch component in association with the control member and the other cooperating latch component on the underside of a detachable cover retaining the control member in the power tool.

This feature has the advantages of simplified assembly of the latching arrangement and ready access thereto.

Accordingly, therefore, there is provided by the present invention a power tool having a changeover mechanism for varying at least one operational mode of the power tool and a control member operatively connected to the changeover mechanism, the control member having associated therewith a rotatable lateral periphery. A detachable cover plate forms a part of the housing of the power tool and conceals said rotatable lateral periphery, the cover plate having an aperture therein through which the control member protrudes. And, a latching arrangement comprises a first latch component formed on said lateral periphery and a second latch component located on the underside of the cover plate, the first and second latch components cooperating to retain the control member in a selected position, and one of the latch components is resilient.

In a preferred embodiment of the present invention, the rotatable lateral periphery carries two first latching components, said first latching components being disposed at diametrically opposite locations on this lateral periphery.

The resilient latch component may comprise a resilient arm, the arm being fixedly mounted at one of its ends, the free end region of the arm cooperating with, and being displaced by, the other latch component located on the rotatable lateral periphery. In such a case, the latch component located on the rotatable lateral periphery can comprise a recess, and the resilient arm, adjacent its free end, may include a portion shaped to correspond to the shape of this recess.

In such a case, the arm may be in the form of a plastics material strip preferably integrally moulded with, the detachable cover. However, in an alternative embodiment, the strip could be in the form of a metallic spring, the end of the spring remote from the free end being mounted on a support member on the detachable cover.

In the preferred embodiment the resilient latch component comprises a double-armed member fixedly connected in its central region to the detachable cover, each arm carrying a detent portion, the detent portion on one of the arms cooperating with the first latch component of a first control member and the detent portion on the other arm cooperating with the first latch component of a second control member.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 3b is a plan view of the control knob shown in FIG. 3a;

FIG. 4b shows a plan view of the control knob shown in FIG. 4a, and

FIG. 5 shows a top plan view, partially broken away and sectioned, of a cover member similar to that shown in FIG. 2 but showing an alternative form of a latching component and shown in position on the electric drill of FIG. 1.

DETAILED DESCRIPTION OF THE PREFERRED EMBODIMENT

Figure 1:
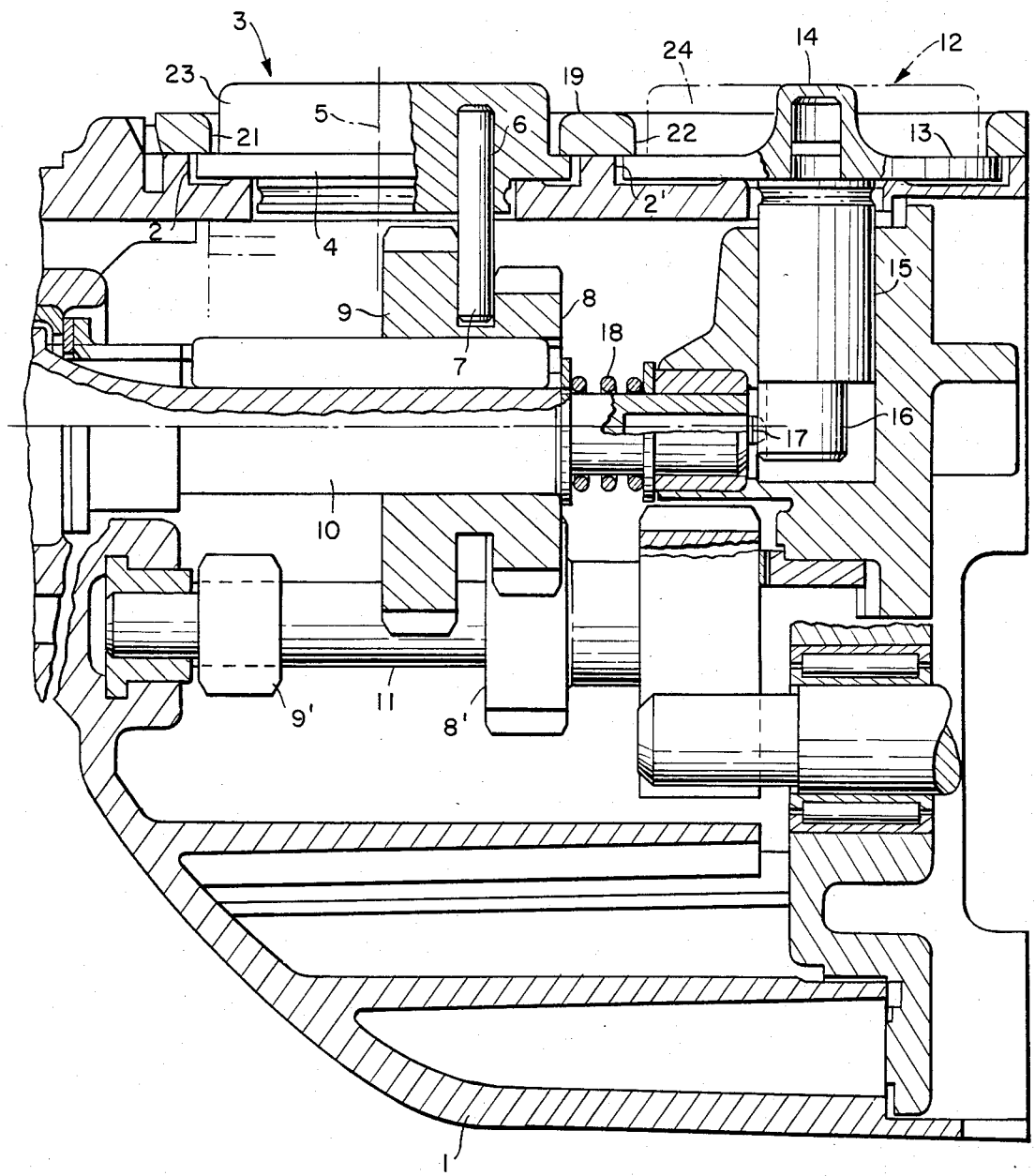
FIG. 1 is a sectional elevational view through part of an electric drill incorporating the latch arrangement in accordance with the present invention.

In FIG. 1, there is shown a sectional elevational view through the interior of a housing 1 of an electric drill which is in fact a hammer drill. In the upper portion of the housing, recesses 2, 2' are formed for receiving mode selector arrangements. Located and seated within the recess 2 is a disc portion 4 of a control knob 3. The control knob 3 is rotatable about an axis of rotation 5 at right angles to the longitudinal axis of the drill. Fixedly mounted in a blind bore formed in the knob 3 parallel to the axis of rotation 5 is a pin member 6. The pin member 6 extends substantially vertically into the interior of the drill housing 1, and its lower end 7 is located between two gear wheels 8, 9 which are keyed onto the main drive shaft 10 of the drill. In the position shown in FIG. 1, it can be seen that a gear wheel 8 is meshing with a gear wheel 8' mounted on a lay shaft 11. It will also be seen that the gear wheel 9 is out of engagement with a second gear wheel 9' mounted on the lay shaft 11. It will also be evident that, by rotating the control knob 3, about its axis of rotation 5, by 180°, the two gear wheels 9, 9' will be in engagement with one another while the gear wheels 8, 8', will be out of engagement with one another. This constitutes a changeover mechanism arrangement for varying the speed of the drill by the control member 3.

In a similar manner, a control knob 12 having a disc portion 13 is located and seated in the recess 2'. The knob 12 is also rotatable about an axis of rotation at right angles to that of the main shaft 10. Fixedly mounted on the disc portion 13, or integrally formed therewith, is a pin member comprising a body portion 15 located within the drill housing 1. The body portion 15 extends substantially vertically and, at its free end remote from the disc portion 13 of the control knob 12, carries a longitudinally extending, eccentric projection portion 16. The side surface of the projection portion 16 engages against a thrust bearing 17 mounted on the rear end of the main shaft 10. In the position shown, the shaft 10 is pushed forwardly, that is to say, towards the left as shown in FIG. 1, against the action of a spring 18. This causes two sets of ratchet teeth (not shown) provided at the front end of the shaft to cooperate with one another, thereby producing a hammer mode of operation for the drill. It is readily apparent that, by rotating the control member 14 through 180°, the shaft 10 could move rearwardly, that is to say, towards the right as shown in FIG. 1, due to the action of the operator when engaging a workpiece with the drill. This, in turn, causes disengagement of the two sets of ratchets and the drill would then function in a drill only mode. Thus, the position of the eccentric projection 16 coacts with the end of the drive shaft 10 to determine the axial location thereof.

Figure 2:
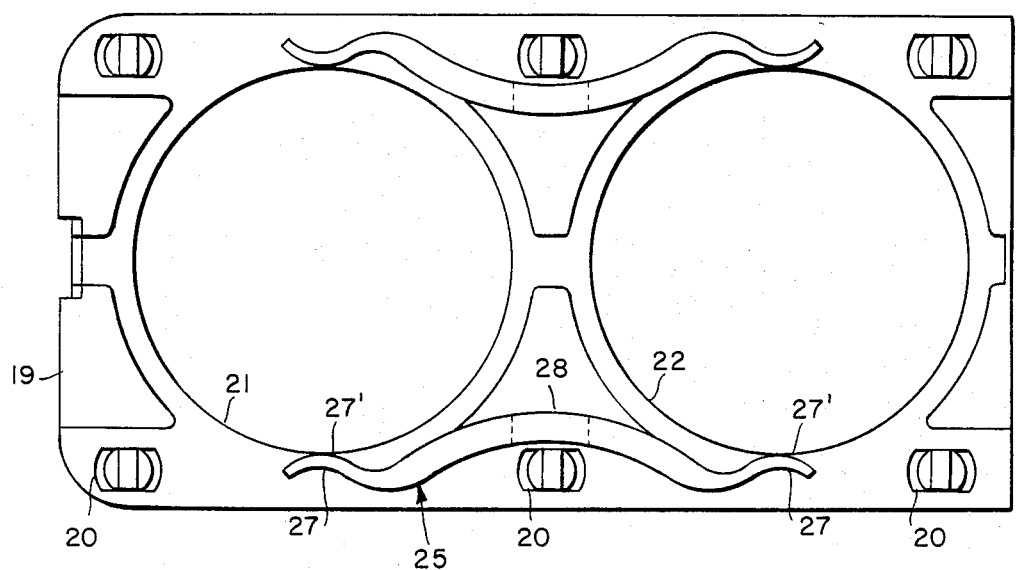
FIG. 2 is an underneath plan view of a cover plate forming part of the housing of the drill shown in FIG. 1, the cover plate incorporating a latching component of the latching arrangement.
Figure 4A:
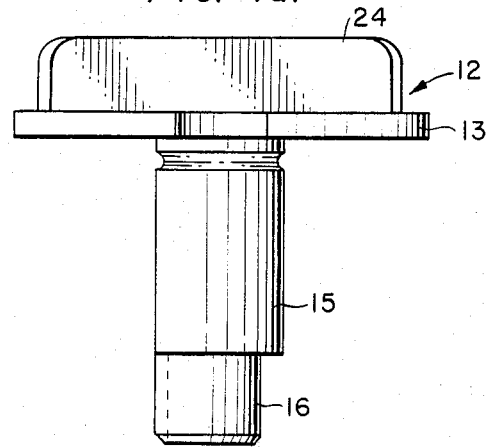
FIG. 4a shows an elevational view of a control knob for altering the mode of operation of the electric drill of FIG. 1.

Reference should now be made to the remaining Figures of the drawings. The control knobs 3 and 12 are retained in position by a cover plate 19, best seen in FIG. 2. The cover plate 19 may be retained in the housing 1 by any suitable means. As shown in FIG. 2, one simple way of achieving this is to provide a plurality of resilient split-pins 20 which are located in, and retained, by, suitable recesses in the housing 1. The cover plate 19 has a pair of apertures 21, 22 formed therein for receiving the control knobs 3 and 12 respectively. The apertures 21 and 22 are dimensioned so as to be slightly smaller than the disc portions 4 and 13 respectively of the control members 3 and 12. Projecting upwardly through the apertures 21 and 22 are lug portions 23 and 24 integrally formed as parts of the control knobs 3 and 12 respectively. Suitable indicia means are provided on the lug portions 23 and 24. Each control knob is rotated by the user grasping the appropriate lug and rotating the knob into a desired position.

As mentioned previously, it is of importance that the control knobs, and the mode selector arrangements associated therewith, are maintained in their desired positions until the user desires to move them. This is effected by utilising a latching arrangement in accordance with the present invention. Basically, the latch arrangement comprises two components, one of the components being identified generally at 25 in FIG. 2 and the other component being identified at 26 and 26' in FIGS. 3b and 4b, respectively. The first latching component, in the embodiment shown in FIG. 2, comprises a fixed central portion 28 and two oppositely directed arm portions 27. From FIG. 2, it will be noted that two such components are provided, both of which are doubled armed. It will, of course, be readily appreciated that each double-armed member could be replaced by two single armed members. Similarly, in a simple version of an electric drill if, for example, only the speed can be changed, each latching component 25 could be a single-armed member. In the embodiment shown in FIG. 2, the free end of each arm portion 27 includes an arcuate detent portion 27'.

The arm portions 27 extend into the recesses 21, 22 and are free to move or flex therein. Because the strip 25 is resilient, it will be readily apparent that, by suitably locating the fixed portion 28, the detent portions 27' can be caused to lie adjacent the periphery of the associated recess 21 or 22 in the relaxed state of the strip component 25. The component 25 may either be attached to the underside of the cover member 19 by means of a suitable adhesive or, preferably, is integrally formed with the cover member 19 during the manufacture thereof by moulding from plastics material.

The second latching component is in the form of a recess 26 or 26' formed in the rotatable lateral surface of the disc portion 4 or 13, respectively, of the control knobs 3 and 12. These recesses 26, 26' receive the detent portions 27' of the strips 25. The configuration of the detent portions 27' and of the recesses 26, 26' are selected so as to correspond with one another. In the preferred embodiment as shown, both are arcuate.

It will be recalled that the diameter of the disc portions 4 and 13, respectively, is greater than the diameter of the apertures 21, 22, respectively. When the control knobs 3, 12 are seated in the housing recesses 2, 2' with the lug portions 23, 24, respectively, projecting therethrough, the rotatable peripheral surfaces of the disc portions 4 and 13 abut against the detent portions 27' of the strip 25. Because of the difference in diameters of the apertures 21, 22 and of periphery of the disc portions 4, 13, the detent portions 27' of the strip 25 will be displaced from their relaxed position in which they lie adjacent the apertures 21, 22. While either or both of the control knobs are being rotated, the arms 27 will be forced to remain in their displaced position because they are constrained to do so by the periphery of the respective disc portion. However, upon continued rotation of the control members, the detent recesses 26 or 26' will come into alignment with the detent portions 27'. When such alignment takes place, the peripheral portion of the disc 4 or 13 no longer causes flexing of the arms 27 of the strip 25 and the arms return to their relaxed position. In this position, the detent portions 27' are located in the recesses 26 or 26' (depending upon which control knob is being rotated). The return of the arm to its relaxed position and its engagement in the associated recess will, in normal circumstances, be felt by the user rotating the control knob. The user will therefore be aware that the knob which has been rotated is now located in one of its two positions of use, and not in an intermediate position.

Because of the natural resilience of the strip 25 and its location in the appropriate recess, it is almost impossible for the control knob to be further rotated and hence the mode of operation of the drill to be further altered, unless such is desired by the user. The latch mechanism does not generally need to be strengthened because the forces acting on the control knob and on the strip 25 are comparatively small.

In an alternative embodiment, and as shown in FIG. 5, the plastics strip 25 is replaced by a flat shaped steel spring 30 having arcuate detent ends, and suitably mounted at its center on a pillar 31 or some similar retaining device which is advantageously, but not essentially, formed on the underside of the cover member 19.

Figure 3A:
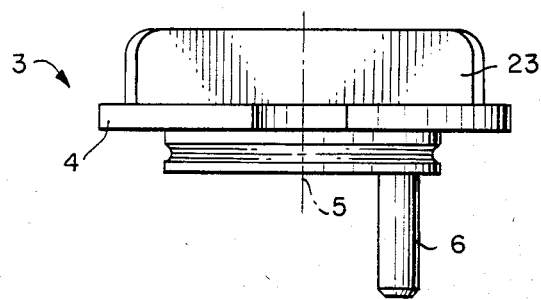
FIG. 3a shows an elevational view of a control knob used for altering the drill speed of the electric drill of FIG. 1.
Figure 3B:
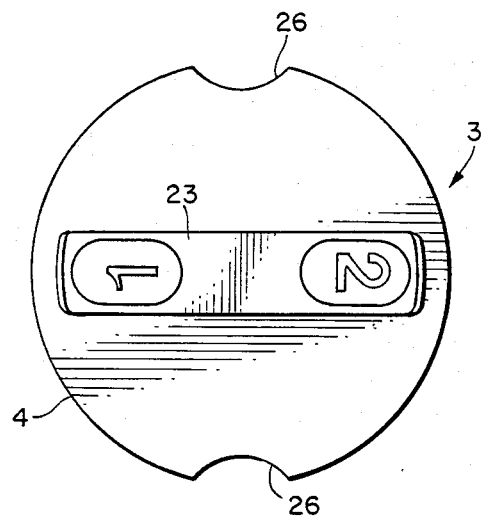
Figure 4B:
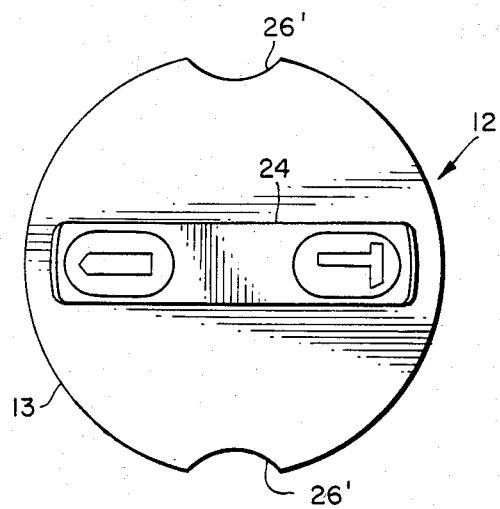

From FIGS. 3b and 4b it will be observed that both disc portions 4 and 13 associated with the control knobs each have two diametrically opposed recesses. By providing two diametrically opposed latch mechanisms, the security of retention of the control knob in its desired position is further improved.

It will be appreciated that by having the detent recesses in the control knobs and the resilient detent arms on the underside of the retaining cover plate, the latching mechanism is simply constucted and readily assembled during manufacture. Further, should it be necessary at any time to have access to and inspect the detent mechanism, this is readily accomplished by simply removing the detachable cover plate.

Various other modifications to the latching arrangement of the present invention can be made without departing from the scope of the invention. Thus, for example, although the preferred embodiments of the invention have been described with the spring or strip being mounted on or affixed to the underside of the cover portion, and the recesses provided in the lateral surface of the disc, it will be readily appreciated that the disc could carry the arm member, which arm member then engages in a suitable recess formed on the underside of the cover member.

Similarly, in the case of a drill having a single change-over mechanism, for example, a speed change mechanism, two recesses may be provided in the lateral periphery of the disc, and a resilient arm member engages in the positions of use, in each of these recesses. In such a case the two arm members could share a common mounting at their fixed ends. It will readily be appreciated that this will produce a pincer type arrangement.

What is claimed is:
1. A power tool, comprising:
means for changing the speed of the tool;
means for changing the mode of operation of the tool;
two control members, one operatively connected to said speed changing means and the other to said mode changing means;
each control member being rotatable and having a disc portion with two diametrically opposed peripheral recesses;
a detachable cover member forming part of the housing of the tool and having two apertures therein, said control members protruding through said apertures, and said apertures being dimensioned smaller than said disc portions whereby said cover plate retains said control members in the tool;
a pair of latch components mounted opposite each other on the under side of said cover member, each latch component comprising two oppositely extending resilient arms having detent portions engageable in said recesses to latch said control members individually in selectable positions upon rotation thereof.

2. The power tool of claim 1, wherein said power tool is a hammer drill having a hammer mode and a drill only mode selectable by the control member connected to said mode changing means.

3. The power tool of claim 2, wherein the speed changing control member has a pin extending downwardly therefrom parallel to but displaced from an axis about which said speed change member is rotatable, said pin operatively engaging between two gears for axial displacement thereof, and the mode changing control member is operatively connected to an eccentric projection rotatable therewith and coacting with an end of a drive shaft of the hammer drill to determine the axial location thereof.

4. The power tool of claim 1, wherein said pair of latch components are integrally moulded with said cover member from plastics material.

5. The power tool of claim 1, wherein each said latch component is connected at its center to said cover member, said detent portions are arcuate end portions of said arms, the arcuate end portions of one latch component are disposed opposite the arcuate end portions of the other latch component, and in each of said selectable positions of each control member the two recesses of that control member are engaged by arcuate end portions of both latch components.

6. A hammer drill having a hammer mode and a drill only mode, said hammer drill comprising:

a housing having a top;

gearing in said housing for enabling the hammer drill to operate at two different speeds of operation, said gearing including a pair of gears connected together and mounted on a rotatable shaft for rotation therewith about a rotational axis;

said pair of gears being movable along said shaft axially;

a speed control member comprising a disc portion with two diametrically opposed peripheral recesses therein, a manually operable lug portion extending upwardly from said disc portion, and a pin member extending downwardly from said disc portion into the interior of said housing;

a mode control member comprising a disc portion also with two diametrically opposed peripheral recesses therein, a manually operable lug portion extending upwardly therefrom, and a pin portion extending downwardly into the interior of said housing;

said housing having in said top thereof two spaced apart recesses in which the disc portions of said speed control and mode control members are respectively seated for rotation about respective parallel axes perpendicular to said rotational axis of said shaft;

said pin member being eccentric to the axis of rotation of said speed control member and engaging between said gears for movement thereof along said shaft for changing the speed of operation of said hammer drill;

said pin portion being eccentric to the axis of rotation of said mode control member and cooperating with an end of said shaft for changing the mode of operation of said hammer drill;

a cover plate detachably connected to said top of said housing by a plurality of fastening members releasably engageable in said housing, said cover plate having two spaced apart apertures therein respectively disposed above said housing recesses;

said apertures being dimensioned smaller than said disc portions of said control members whereby said cover plate retains said disc portions in said housing recesses, the lug of each control member protruding upwardly through a respective one of said apertures; and a pair of resilient strips, each attached between the ends thereof to the underside of said cover plate, each resilient strip having an arcuate portion at each end, said resilient strips being disposed on opposite sides of said two spaced apart apertures with the arcuate portions of each strip resiliently engaging the peripheries of said disc portions;

whereby upon rotation of either control member both the peripheral recesses thereof are engageable by arcuate end portions of both said strips to releasably latch that control member in either of two rotational positions 180 degrees apart.

7. The hammer drill of claim 6, wherein said cover plate and said resilient strips are integrally formed of plastic material, and said fastening members comprise resilient split pins.

* * * * *